(12) United States Patent
Beijbom et al.

(10) Patent No.: US 11,321,211 B1
(45) Date of Patent: May 3, 2022

(54) METRIC BACK-PROPAGATION FOR SUBSYSTEM PERFORMANCE EVALUATION

(71) Applicant: Motional AD LLC, Boston, MA (US)

(72) Inventors: Oscar Olof Beijbom, Santa Monica, CA (US); Bassam Helou, Santa Monica, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/180,649

(22) Filed: Feb. 19, 2021

Related U.S. Application Data

(60) Provisional application No. 63/105,329, filed on Oct. 25, 2020.

(51) Int. Cl.
| | |
|---|---|
| *G06F 11/00* | (2006.01) |
| *G06F 11/34* | (2006.01) |
| *B60W 50/06* | (2006.01) |
| *B60W 50/04* | (2006.01) |
| *G06F 11/27* | (2006.01) |

(52) U.S. Cl.
CPC ......... *G06F 11/3409* (2013.01); *B60W 50/04* (2013.01); *B60W 50/06* (2013.01); *G06F 11/27* (2013.01)

(58) Field of Classification Search
CPC .. G06F 11/079; G06F 11/263; G06F 11/0709; G06F 11/26; G06F 11/2294; G06F 11/0751; G06F 11/3684; G06F 11/0745; G06F 11/0748; G06F 11/0793; G06F 11/3409
See application file for complete search history.

(56) References Cited

U.S. PATENT DOCUMENTS

| | | | | |
|---|---|---|---|---|
| 8,725,667 | B2 * | 5/2014 | Kaushal | G06N 5/04 706/14 |
| 9,527,515 | B2 * | 12/2016 | Hunt | F01N 9/002 |
| 10,345,811 | B2 * | 7/2019 | Phillips | G05D 1/0088 |
| 10,855,927 | B2 * | 12/2020 | Jung | G09G 3/20 |
| 10,885,240 | B2 * | 1/2021 | Tascione | G05D 1/0212 |
| 2010/0030586 | A1 * | 2/2010 | Taylor | G06Q 40/08 705/4 |

(Continued)

OTHER PUBLICATIONS

[No Author Listed], "SAE: Surface Vehicle recommended Practice," SAE, Sep. 30, 2016, 30 pages.

(Continued)

*Primary Examiner* — Amine Riad
(74) *Attorney, Agent, or Firm* — Fish & Richardson P.C.

(57) ABSTRACT

Provided are systems, methods and computer program products for evaluating subsystem performance. In some embodiments, a method comprises perturbing a first attribute of a first subsystem of a system that includes a plurality of subsystems, determining a change in a second attribute of a second subsystem of the system in response to the perturbing of the first attribute, where at least one output of the first subsystem is passed to the second subsystem, and determining a value for a performance metric of the system based on a correlation of the performance metric with the first and second attributes. In some embodiments, the system is a software stack of an autonomous vehicle (AV) and the performance metric is an objective function output that measures a quality of the AV's driving behavior.

26 Claims, 7 Drawing Sheets

(56) References Cited

U.S. PATENT DOCUMENTS

| | | |
|---|---|---|
| 2018/0024239 A1* | 1/2018 | Branson ............... G05D 1/0088 701/23 |
| 2019/0051015 A1* | 2/2019 | Gonzalez Aguirre .... G06T 7/80 |
| 2019/0129436 A1 | 5/2019 | Sun et al. |
| 2019/0146492 A1 | 5/2019 | Phillips et al. |
| 2019/0163181 A1 | 5/2019 | Liu et al. |
| 2020/0117565 A1* | 4/2020 | Ponnuvel ............ G06F 11/0793 |
| 2020/0250363 A1* | 8/2020 | Partridge ................ G06F 30/15 |
| 2021/0101619 A1* | 4/2021 | Weast ............... B60W 60/0015 |

OTHER PUBLICATIONS

Caesar et al., "nuScenes: A multimodal dataset for autonomous driving," CVPR, Mar. 26, 2019, 16 pages.

Censi et al., "Liability, ethics, and culture-aware behavior specification using rulebooks," 2019 International Conference on Robotics and Automation (ICRA), Feb. 25, 2019, 10 pages.

Karkus et al., "Differentiable Algorithm Networks for Composable Robot Learning," Robotics: Science and Systems (RSS), May 2019, 12 pages.

Manivasagam et al., "Lidarsim: Realistic lidar simulation by leveraging the real world," Proceedings of the IEEE/CVF Conference on Computer Vision and Pattern Recognition, Jun. 16, 2020, 11 pages.

Philion et al., "Learning to evaluate perception models using planner-centric metrics," IEEE/CVF Conference on Computer Vision and Pattern Recognition, Apr. 19, 2020, 10 pages.

\* cited by examiner

METRIC BACK-PROPAGATION FOR SUBSYSTEM PERFORMANCE EVALUATION

CROSS-REFERENCE TO RELATED APPLICATION

This application claims the benefit of U.S. Provisional Patent Application 63/105,329, filed Oct. 25, 2020, and titled "METRIC BACK-PROPAGATION FOR SUBSYSTEM PERFORMANCE EVALUATION," the contents of which are incorporated herein by reference in their entirety.

FIELD OF THE INVENTION

This description relates to subsystem performance evaluation with respect to a system level objective function.

BACKGROUND

A system, for example a system included in an autonomous vehicle (AV), generally includes a number of related subsystems which receive or transmit data. In these subsystems, it can be difficult to identify how to alter a parameter of a given subsystem to improve performance of the system.

DETAILED DESCRIPTION

Figure 1:
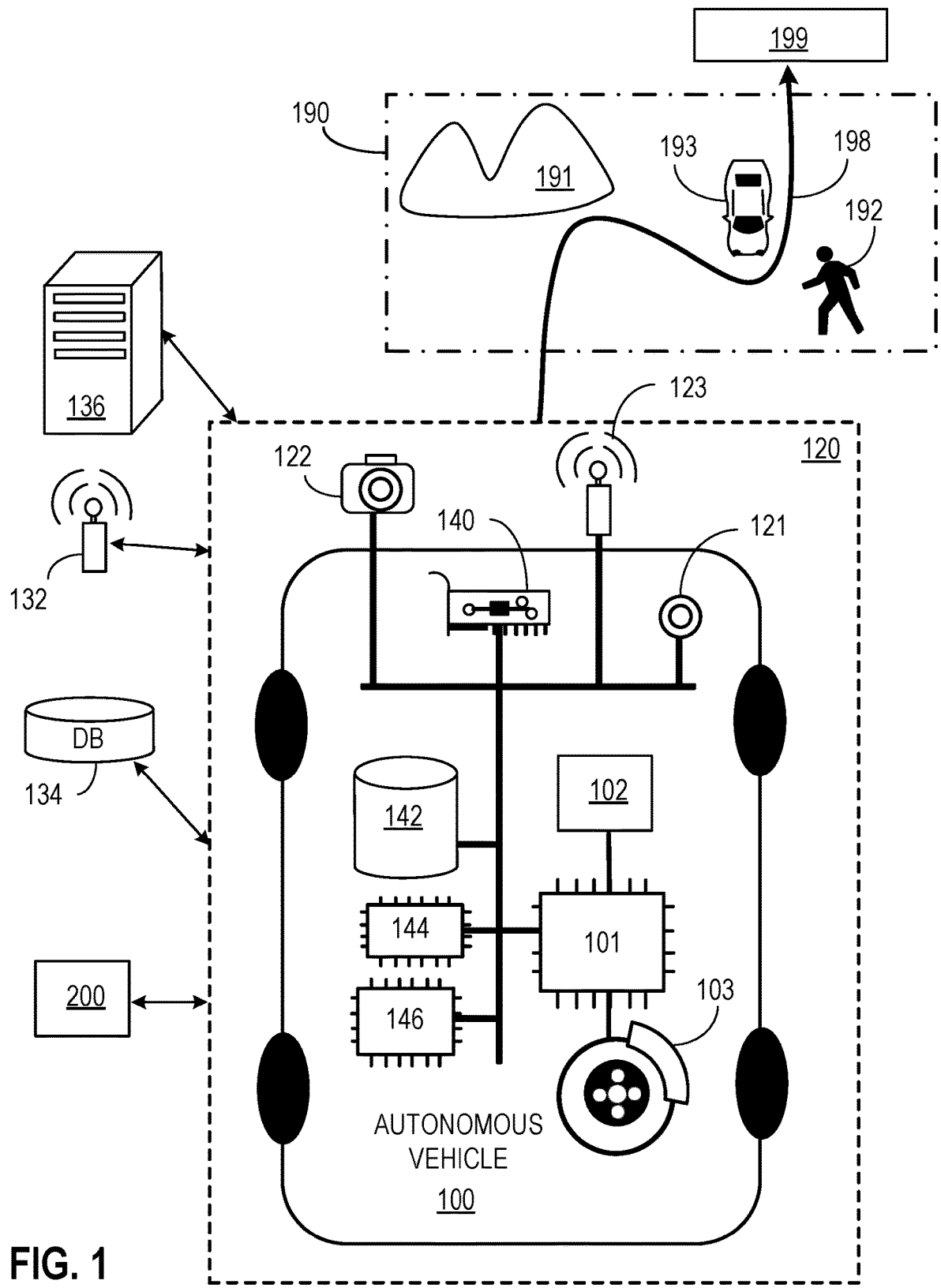
FIG. 1 is a diagram showing an example of an AV having autonomous capability operating in an environment.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. AV Inputs
5. AV Subsystem Perturbation and Modeling General Overview Disclosed herein are systems, methods, and computer program products for subsystem performance evaluation with respect to a system level object function.

In some embodiments, a method comprises: perturbing, using at least one processor, a first attribute of a first subsystem of a system that includes a plurality of subsystems; determining, using the at least one processor, a change in a second attribute of a second subsystem of the system in response to the perturbing of the first attribute, where at least one output of the first subsystem is passed to the second subsystem; and determining, using the at least one processor, a value for a performance metric of the system based on a correlation of the performance metric with the first and second attributes.

In some embodiments, the method further comprises: evaluating, using a first test fixture, performance of the first subsystem in response to perturbing the first attribute; computing, using the at least one processor, a first score based on the evaluation of the first subsystem; evaluating, using a second test fixture, performance of the second subsystem in response to perturbing the first attribute; computing, using the at least one processor, a second score based on the evaluation of the second subsystem; and determining the value of the performance metric based on the first score and the second score.

In an embodiment, determining the value of the performance metric further comprises predicting the value of the performance metric using a gradient of perturbed first and second scores.

In an embodiment, the second test fixture does not include data that can be run on the first subsystem and the method further comprises simulating how the second subsystem would affect the data on the second text fixture (e.g., degrading ground truth information used in the first test fixture).

In an embodiment, the gradient is estimated using a linear model between the performance metric and the perturbed first and second scores.

In an embodiment, the value of the performance metric is predicted by applying a linear least squares formulation to the linear model.

In an embodiment, the value of the performance metric is predicted for an alternative implementation of the first subsystem.

In an embodiment, the performance metric is a system level objective function.

In an embodiment, the system is a software stack of an autonomous vehicle (AV), and the performance metric is an objective function output that measures a quality of the AV's driving behavior.

In an embodiment, the system includes a third subsystem that receives output of the second subsystem and a fourth subsystem that receives output of the third subsystem, the first subsystem is a sensor subsystem, the second subsystem is a perception subsystem that receives sensor data from the sensor, the third subsystem is a tracking subsystem that receives object detections from the perception subsystem, the fourth subsystem is a planner that receives object tracks from the tracking subsystem, and the performance metric is determined using a processor and a test fixture of the planner.

In an embodiment, the object tracks are simulated by degrading ground-truth tracks in the planner's test fixtures.

In an embodiment, the performance metric takes into account a failure rate of at least one of the first or second subsystems.

In an embodiment, a system comprises: at least one processor; memory storing instructions that when executed by the at least one processor, cause the at least one processor to perform any of the methods described above.

By virtue of the implementation of systems, methods, and computer program products described herein, techniques for subsystem performance evaluation can result in more accurate determinations as to how each of the subsystems affect the overall system and/or at least one other subsystem. Additionally, or alternatively, subsystems can be evaluated and selected for implementation such that the system overall is more efficient than if other subsystems had been selected without evaluation in the manners described herein. This, in turn, provides for more efficient systems that can operate using less resources.

System Overview

FIG. 1 is a diagram showing an example of a vehicle having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an AV is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real-world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a random-access memory (RAM) and/or a non-volatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computer processors 146 are similar to the processor 204 described below in reference to FIG. 2. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, Light Detection and Ranging (LiDAR) 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, computer peripherals 132 are similar to the display 212, input device 214, and cursor controller 216 discussed below in reference to FIG. 2. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the vehicle 100 or another entity. For example, a third party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third party AV system, the vehicle 100, or to another AV. This enables the passenger's privacy level to specify which other entities are allowed to receive data about the passenger's actions or other data associated with the passenger.

Figure 2:
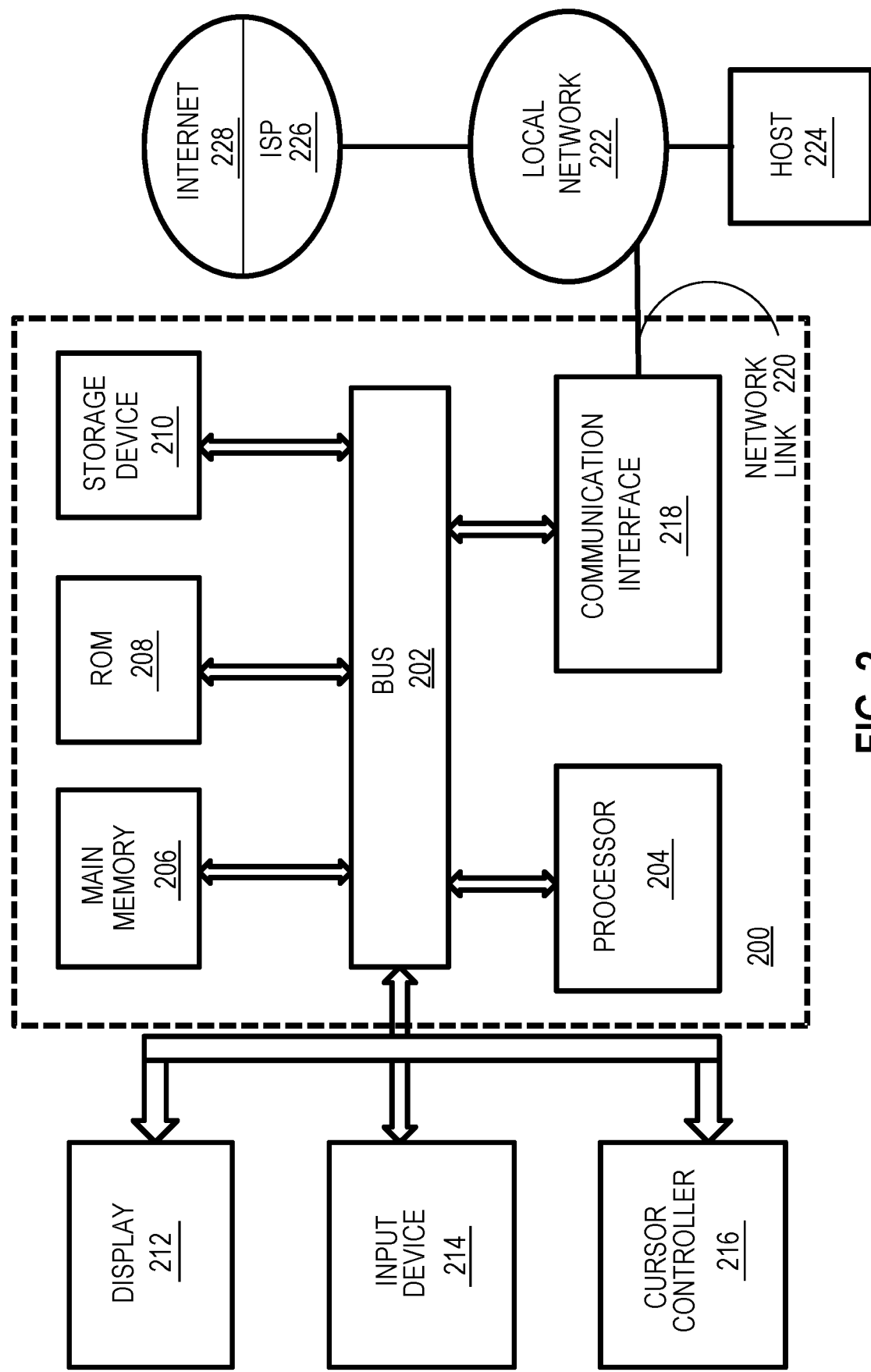
FIG. 2 is a diagram showing a computer system.

FIG. 2 is a diagram showing a computer system 200. In an implementation, the computer system 200 is a special-purpose computing device. The special-purpose computing device is hard-wired to perform the techniques or includes digital electronic devices such as one or more ASICs or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 200 includes a bus 202 or other communication mechanism for communicating information, and a processor 204 coupled with a bus 202 for processing information. The processor 204 is, for example, a general purpose microprocessor. The computer system 200 also includes a main memory 206, such as a RAM or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In an embodiment, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to one embodiment, the techniques herein are performed by the computer system 200 in response to the processor 204 executing one or more sequences of one or more instructions contained in the main memory 206. Such instructions are read into the main memory 206 from another storage medium, such as the storage device 210. Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210. Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In an embodiment, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and send the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 can optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network link 220 contains the cloud or a part of the cloud.

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

AV Architecture

Figure 3:
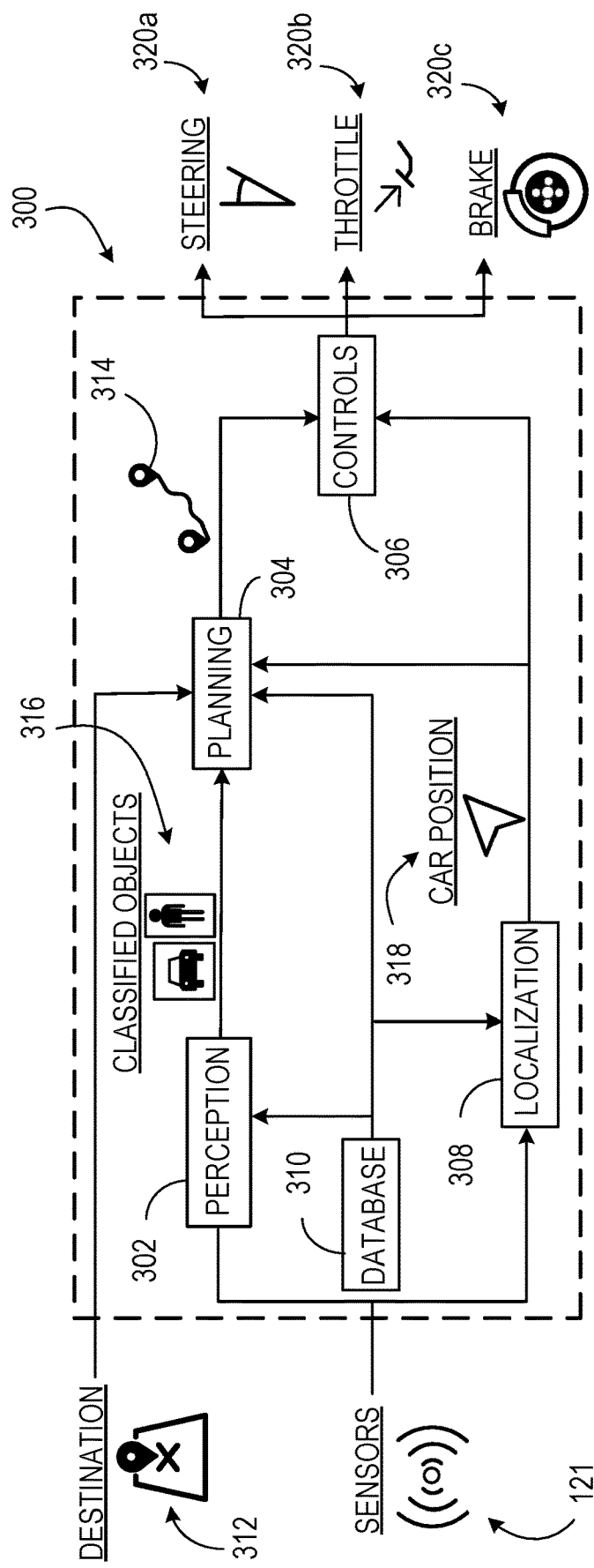
FIG. 3 is a diagram showing an example architecture for an AV.

FIG. 3 is a diagram showing an example architecture 300 for an AV (e.g., the vehicle 100 shown in FIG. 1). The architecture 300 includes a perception subsystem 302 (sometimes referred to as a perception circuit), a planning subsystem 304 (sometimes referred to as a planning circuit), a control subsystem 306 (sometimes referred to as a control circuit), a localization subsystem 308 (sometimes referred to as a localization circuit), and a database subsystem 310 (sometimes referred to as a database circuit). Each subsystem plays a role in the operation of the vehicle 100. Together, the subsystems 302, 304, 306, 308, and 310 can be part of the AV system 120 shown in FIG. 1. In some embodiments, any of the subsystems 302, 304, 306, 308, and 310 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the subsystems 302, 304, 306, 308, and 310 is sometimes referred to as a processing circuit (e.g., computer hardware, computer software, or a combination of the two). A combination of any or all of the subsystems 302, 304, 306, 308, and 310 is also an example of a processing circuit.

In use, the planning subsystem 304 receives data representing a destination 312 and determines data representing a trajectory 314 (sometimes referred to as a route) that can be traveled by the vehicle 100 to reach (e.g., arrive at) the destination 312. In order for the planning subsystem 304 to determine the data representing the trajectory 314, the planning subsystem 304 receives data from the perception subsystem 302, the localization subsystem 308, and the database subsystem 310.

The perception subsystem 302 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 316 is provided to the planning subsystem 304.

The planning subsystem 304 also receives data representing the AV position 318 from the localization subsystem 308. The localization subsystem 308 determines the AV position by using data from the sensors 121 and data from the database subsystem 310 (e.g., a geographic data) to calculate a position. For example, the localization subsystem 308 uses data from a GNSS (Global Navigation Satellite System) sensor and geographic data to calculate a longitude and latitude of the AV. In an embodiment, data used by the localization subsystem 308 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control subsystem 306 receives the data representing the trajectory 314 and the data representing the AV position 318 and operates the control functions 320a-c (e.g., steering, throttling, braking, ignition) of the AV in a manner that will cause the vehicle 100 to travel the trajectory 314 to the destination 312. For example, if the trajectory 314 includes a left turn, the control subsystem 306 will operate the control functions 320a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 4:
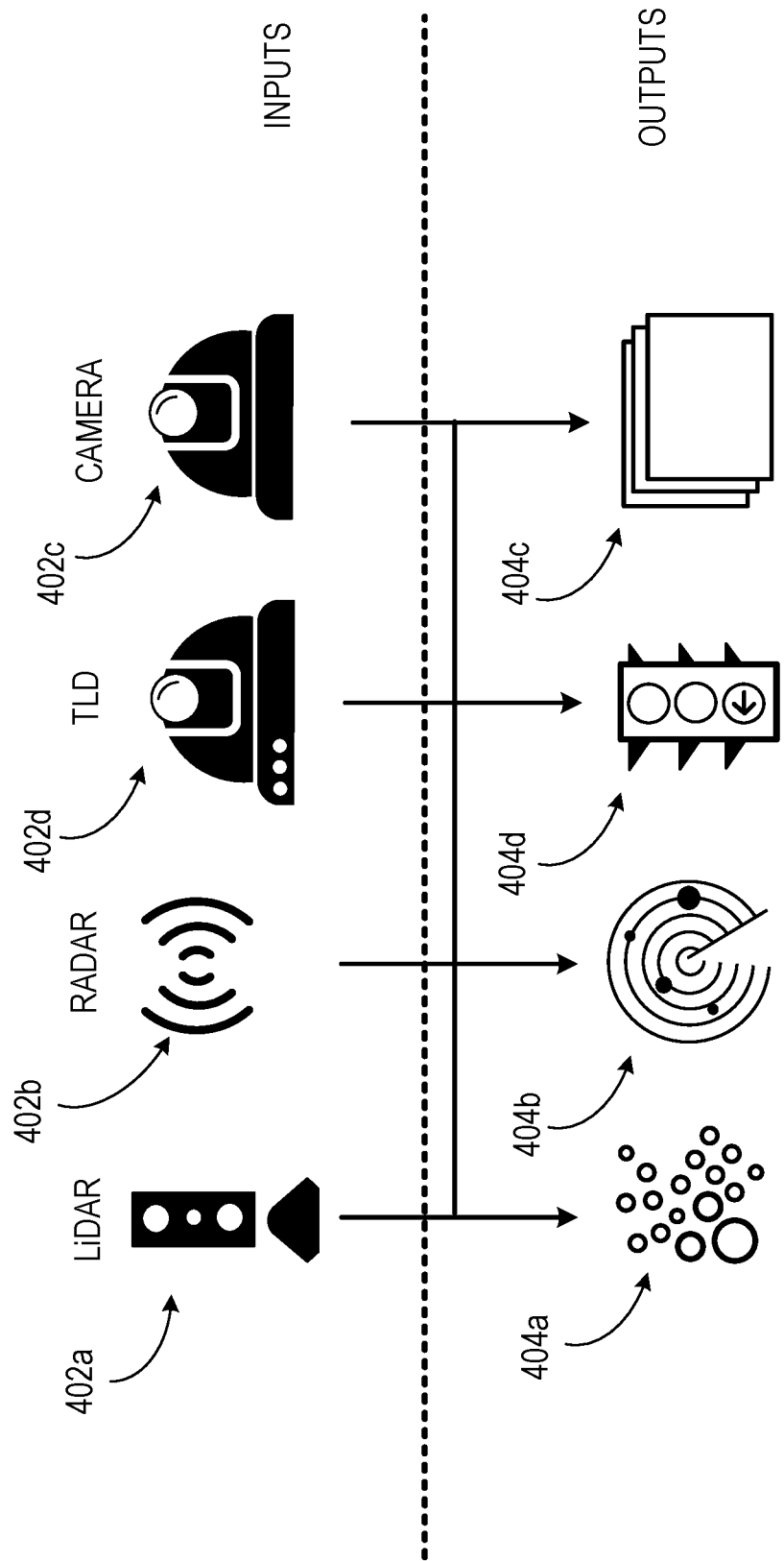
FIG. 4 is a diagram showing an example of inputs and outputs that can be used by a perception system.

FIG. 4 is a diagram showing an example of inputs 402a-d (e.g., sensors 121 shown in FIG. 1) and outputs 404a-d (e.g., sensor data) that is used by the perception subsystem 302 (FIG. 3). One input 402a is LiDAR output data (e.g., LiDAR 123 shown in FIG. 1). LiDAR is a technology that uses light (e.g., bursts of light such as infrared light) to obtain data about physical objects in its line of sight. A LiDAR subsystem produces LiDAR data as output 404a. For example, LiDAR data are collections of three-dimensional (3D) or two-dimensional (2D) points (also known as a "point clouds") that are used to construct a representation of the environment 190.

Another input 402b is RADAR data. RADAR is a technology that uses radio waves to obtain data about nearby physical objects. RADARs can obtain data about objects not within the line of sight of a LiDAR. A RADAR subsystem produces RADAR data as output 404b. For example, RADAR data are one or more radio frequency (RF) signals that are used to construct a representation of the environment 190.

Another input 402c is camera data. A camera subsystem uses one or more cameras (e.g., digital cameras using a light sensor such as a charge-coupled device [CCD]) to obtain information about nearby physical objects. A camera system produces camera data as output 404c. Camera data often takes the form of image data (e.g., data in an image data format such as RAW, JPEG, PNG, etc.). In some examples, the camera subsystem has multiple independent cameras, e.g., for the purpose of stereopsis (stereo vision), which enables the camera subsystem to perceive depth. Although the objects perceived by the camera subsystem are described here as "nearby," this is relative to the AV. In some embodiments, the camera subsystem is configured to "see" objects far, e.g., up to a kilometer or more ahead of the AV. Accordingly, in some embodiments, the camera subsystem has features such as sensors and lenses that are optimized for perceiving objects that are far away.

Another input 402d is traffic light detection (TLD) data. A TLD subsystem uses one or more cameras to obtain information about traffic lights, street signs, and other physical objects that provide visual navigation information. A TLD subsystem produces TLD data as output 404d. TLD data often takes the form of image data (e.g., data in an image data format such as RAW, JPEG, PNG, etc.). A TLD subsystem differs from a system incorporating a camera in that a TLD subsystem uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD subsystem is about 120 degrees or more.

In some embodiments, outputs 404a-d are combined using a sensor fusion technique. Thus, either the individual outputs 404a-d are provided to other subsystems of the vehicle 100 (e.g., provided to a planning subsystem 304 as shown in FIG. 3), or the combined output can be provided to the other subsystems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

AV Subsystem Perturbation and Modeling

As previously noted, in a system with a variety of subsystems, it can be difficult to identify which of a variety of different options to use for a given subsystem (e.g., different models of the subsystem with more or fewer parameters), or how to alter a parameter of a given subsystem to improve overall system performance.

Embodiments herein relate to the assumption that a system level objective function exists (e.g., a reasonable crowd metric described below), and that such a function can be used to either guide the design of a subsystem or choose between different implementations of that subsystem. In the former case (guidance of design of a subsystem), certain embodiments described herein relate to finding at least one attribute of the subsystem that most correlates with system level performance. In the latter case (choosing between different implementations of a subsystem), embodiments described herein relate to choosing the implementation that results in the highest system level performance.

In an AV stack with multiple subsystems, it can be desirable to ensure that the performance of a particular subsystem is optimized based on the system level objective function. Therefore, certain embodiments described herein relate to procedures that address this objective. Additionally, certain embodiments described herein relate to procedures that involve the use of test fixtures in evaluating different subsystems.

For example, an embodiment described herein evaluates an image detector based on the image detector's ability to detect other vehicles at a certain distance, average precision (AP) for pedestrians, a mean AP across all classes (e.g., pedestrians, vehicles, roadside objects, and/or the like), and/or by other metrics. These metrics can be calculated using a test fixture specific to the image detector, for example a dataset that includes images annotated with two-dimensional (2D) bounding boxes and segmentation masks. However, it will be desirable for the image detector to collect images that capture situations that are challenging to the vision subsystem: unusual weather or light conditions, cluttered scenes, strangely dressed pedestrians, etc.

As another example, the test fixture of a LiDAR detector subsystem includes LiDAR point clouds annotated with 3D bounding boxes. The data again will relate to challenging situations, but these situations are different from those of the image detector as described above. For example, a LiDAR detector does not have any difficulties at night, but some systems will struggle with black vehicles because the vehicles tend to absorb rather than reflect the LiDAR's pulses of light.

These LiDAR detector and image detector subsystems included in the test fixture of a LiDAR detector subsystem are in turn different from the test fixtures used for the planning subsystem 304. Specifically, an embodiment of a text fixture used for the planning subsystem 304 will suffice to have a bank of scenarios encoded in a "box-world" where the perception problem is abstracted away. The advantage of such a box-world is that it is easy to generate complex and dangerous scenarios.

With such a variety of subsystems, one approach for optimizing the system level objective function is to use a single test fixture for the whole system. Another approach for optimizing the system level objective function is to use a fully-featured simulator with access to complex 3D environments. By contrast, certain embodiments herein relate to an approach where test fixtures are kept separate, and correlations between the different subsystem metrics are modeled based on the separate test fixtures.

Figure 5:
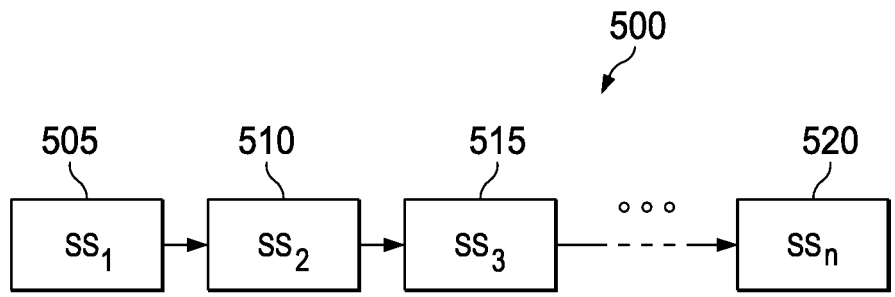
FIG. 5 is a diagram showing a simplified system with a plurality of subsystems, in accordance with various embodiments.

FIG. 5 is a diagram showing a simplified example system 500, in accordance with various embodiments. The system 500 includes a first subsystem, $SS_1$ 505, a second subsystem $SS_2$ 510, a third subsystem $SS_n$ 515, and an $n^{th}$ subsystem $SS_n$ 520. In this example, information flows through the system 500 as depicted in FIG. 5. For example, information flows from SSI 505 to $SS_2$ 510, where the information is processed at $SS_2$ 510. The processed information from $SS_2$ 510 is then provided to $SS_3$ 515 for further processing, and so on.

As described above, it is desirable to identify how to optimize, for example $SS_2$ 510 to improve the overall performance of the system 500. In one embodiment, such optimization includes optimization of an attribute of $SS_2$ 510 such as a setting or configuration of $SS_2$ 510. In another embodiment, such optimization includes identifying which of a plurality of possible alternative subsystems to use for $SS_2$ 510. It will be understood that these are only examples of such optimization, and in other embodiments the optimization of a subsystem to improve the overall performance of the system 500 includes alternative optimization statements such as identifying which of a plurality of possible alternative subsystems to use in addition to optimization of particular attributes for those subsystem(s). The example system described below is an AV software stack for an AV. Other systems, however, could utilize and benefit from the embodiments described below.

Example AV Stack Embodiment

At instances of time during operation of an AV, the AV stack decides the immediate action that the AV needs to perform. To do so, the stack processes the sensor data collected up to the current time, and a database of prior information on the environment (e.g., a map).

Going from raw sensor data to a decision involves a series of subsystems that consecutively process and update (e.g., enrich, refine, and/or the like) the raw data with semantics (e.g., the location of other vehicles, and predictions of their future paths), culminating in a rich representation of the data that is passed to a decision-making unit.

In the AV stack, the output data of any subsystem may not be provided back to the subsystem for further processing in real-world implementations. In an embodiment, the AV stack is represented as a Directed Acyclic Graph (DAG), where a vertex is a subsystem and a directed edge is the connection between two subsystems. Specifically, the vertices will be the collection of N subsystems:

$$S=(s_1, \ldots, s_{N-1}, s_N=d) \quad [1]$$

where S is the system, $s_1, \ldots, s_{N-1}, s_N$ are the subsystems of the System S, N is an integer, and $s_N$ refers to the last subsystem which is also referred to herein as the decision-making unit d. An edge in the DAG indicates that the outputs of a particular subsystem $s_1, \ldots, s_{N-1}$ are passed on to another subsystem, described mathematically as:

$$\varepsilon=\{(s_{e,1}, s_{e,2})|s_{e,1}, s_{e,2} \in S\}_{e=1}^{e=E} \quad [2]$$

where E is an integer, and $(s_{e,1}, s_{e,2})$ indicates that the outputs of $s_{e,1}$ are fed to $s_{e,2}$ as inputs.

To reduce the complexity of the notation used herein, $s_i$ is used for $i=1, \ldots, N$, to denote either the subsystem as a general (model-agnostic) concept (e.g., an object detector) or its implementation. It will be clear to a person of skill in the art which is intended herein based on the context of the discussion.

Characterizing the Subsystems

Although each subsystem of a given system could be a complicated algorithm with up to billions of parameters, the analysis of any particular subsystem is simplified by looking only at certain attributes of the subsystem.

In some embodiments, the attributes of the subsystem include criteria (e.g., interpretable criteria) that each subsystem can be evaluated on. For example, a 3D object detector, such as can be an element of perception subsystem 302, minimizes (among other things) the error in the predicted orientation of objects. In another embodiment, the criteria is based on a temporal correlation of the 3D object detector's measurements.

For the sake of discussion herein, a subsystem $s_i$'s scores $r_i$ are denoted, for $i=1, \ldots, N$ subsystems, on such criteria by:

$$r_i \in \mathbb{R}^{n_i}, \quad [3]$$

where $n_i$ is an integer. In an embodiment, the decision-making unit d has a single attribute: a system level objective function that measures the quality of the AV's driving behavior, also referred to as a system performance metric. Since the system level objective function returns a scaler, the discussion herein uses the following notation:

$$r_N = r_N \in \mathbb{R}. \quad [4]$$

Note that, in other embodiments, the decision-making unit has or is based on additional or alternative attributes which may be useful for, for example, debugging or some other procedure.

In an embodiment, each subsystem's score $r_i$ is obtained by an evaluation procedure that is denoted herein by $R_i$. The evaluation procedure $R_i$ takes the outputs of subsystem $s_i$ and calculates a score $r_i$ for subsystem $s_i$ based on a set of evaluation functions and a database of test fixtures. In one example, for the task of object detection (e.g., performed by perception subsystem 302 of an AV stack), the test fixtures include annotated sensor data. Based on the annotated sensor data, the evaluation function(s) $R_i$ calculate recall, precision, accuracy, etc. In one embodiment, for the task of planning, the test fixtures are a scenario database and a simulator, and the evaluation function identifies violations of the rules of the road based on a pre-identified rulebook.

It is desirable to carefully select what attributes of $s_i$ to include in $r_i$. If $r_i$ is not a sufficiently rich representation of $s_i$, then any analysis based on $r_i$ will not result in reliable insights. For example, characterizing a 3D object detector just by the orientation error it produces is not enough data in some embodiments, as two object detectors that have the same orientation error could be vastly different from one another in other respects. For example, one detector may only give orientation errors for far away objects, whereas another detector may only give orientation errors for close by objects. On the other hand, if $r_i$ has too many components, an analysis based on $r_i$ will require a prohibitive amount of computing resources. One way to determine the relevant attributes of a subsystem $s_i$ to factor into the score $r_i$ for the subsystem is to investigate its different implementations, and extract the characteristics that vary the most.

Figure 6:
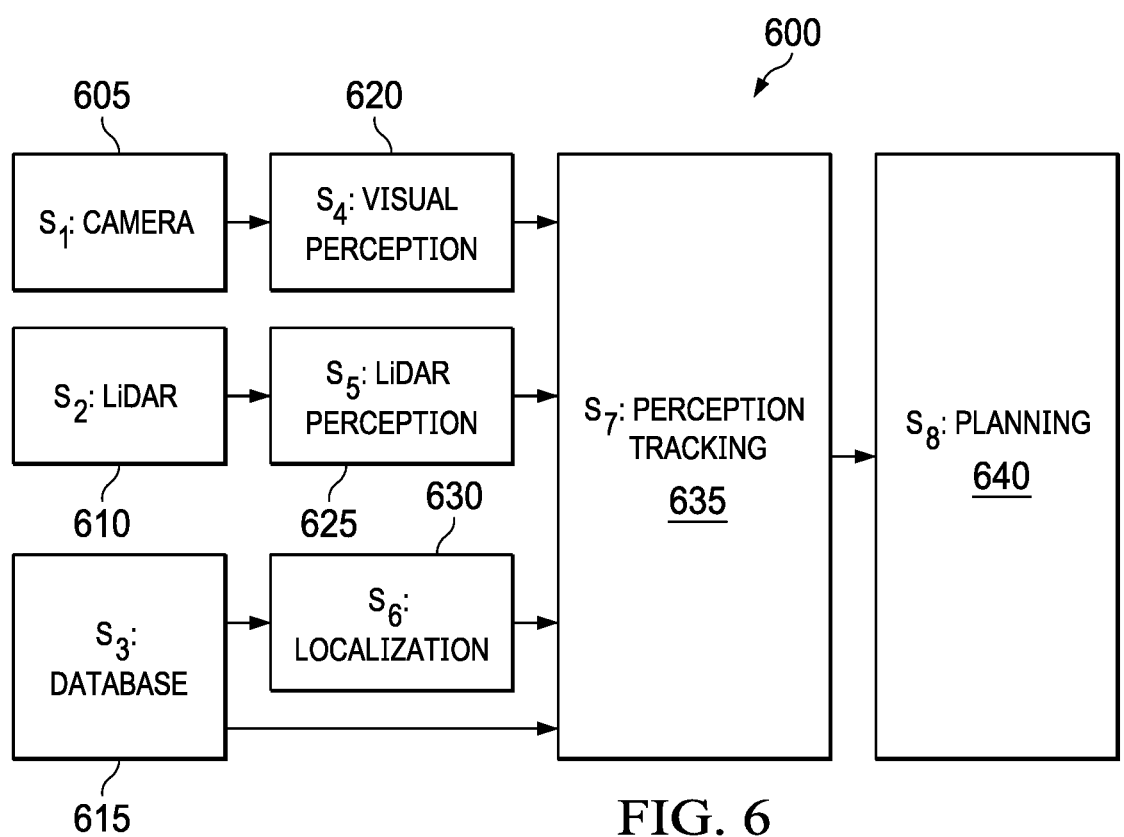
FIG. 6 is a diagram showing an alternative example AV stack, in accordance with various embodiments.

FIG. 6 is a diagram showing an alternative example AV stack 600, in accordance with various embodiments. Specifically, the depicted AV stack 600 includes specific subsystems in accordance with one simplified embodiment of an AV stack of an AV. It will be understood that this description of the AV stack 600 is intended as an example of one embodiment. In other embodiments, the AV stack 600 may include different subsystems, subsystems with different parameters, subsystems in a different configuration or with different inputs or outputs, etc. Other variations may further be present in other embodiments.

Additionally, as used herein, the term "downstream" subsystem refers to subsystems that receives input data from another subsystem in the AV stack, the another subsystem referred to as an "upstream" subsystem. For example, planning subsystem 640 is "downstream" from tracking subsystem 635 because planning subsystem 640 receives input data from tracking subsystem 635. Conversely, tracking subsystem 635 is "upstream" from planning subsystem 640 because it provides input data to planning subsystem 640.

The AV stack 600 includes camera subsystem 605, which is denoted as $s_1$. The camera subsystem 605 is similar to, for example, camera subsystem 402c. In this embodiment, a score $r_1$ for camera subsystem 605 is based on an attribute that is defined as the percent of corrupted pixels produced by the camera subsystem 605. The evaluation procedure, $R_1$, for the camera subsystem 605 involves a test in a calibration room using calibration target images (e.g., checkerboard targets). The output of the camera subsystem 605 includes image data associated with an image.

The AV stack 600 further includes a LiDAR subsystem 610, which is denoted as $s_2$. The LiDAR subsystem 610 is similar to, for example, LiDAR subsystem 402a. In this embodiment, the score $r_2$ of LiDAR subsystem 610 is based on the average distance error produced by the LiDAR subsystem 610. The evaluation procedure, $R_2$, for the LiDAR subsystem 610 involves a test in a calibration room using target object distances. The output of the LiDAR subsystem 610 includes point cloud data associated with a point cloud.

The AV stack 600 further includes a database subsystem 615, which is denoted as subsystem $s_3$. The database subsystem 615 is similar to, for example, database subsystem 310. In this embodiment, the score $r_3$ of the database subsystem 615 is based on the percent of corrupted locations in the database subsystem 615. The evaluation procedure, $R_3$, for the database subsystem 615 involves a query of the database subsystem 615 and a comparison of a map received in a response to the query against a target map. The output of the database subsystem 615 is map data associated with a map.

In embodiments, the camera subsystem 605, LiDAR subsystem 610, and database subsystem 615 are identified as inputs. That is, they provide data as input which is used by other subsystems (e.g., downstream subsystems) of the AV stack 600 for further processing. In other embodiments, the AV stack 600 includes more or fewer input data than depicted in FIG. 6.

The AV stack 600 further includes a visual perception subsystem 620, which is denoted as $s_4$. The visual perception subsystem 620 can be the same as, or similar to, the perception system 302. More specifically, the visual perception subsystem 620 is, or is an element of, the perception subsystem 302. The visual perception subsystem 620 uses as input the image data provided by the camera 605. In this embodiment, the score $r_4$ of the visual perception subsystem 620 is based on one or more of a mean average precision (mAP), attributes' recall, or confusion matrix related to the visual perception subsystem 620. The evaluation procedure, $R_4$, for the visual perception subsystem 620 involves performing image objection detection on a collection of annotated images and comparing the results to target or pre-identified results. The output of the visual perception subsystem 620 is data related to (e.g., representing) 2D objects (e.g., a number of the objects, their shape, their location, etc.).

The AV stack 600 further includes a LiDAR semantic network subsystem 625, which is denoted as $s_5$. The LiDAR semantic network subsystem 625 shares one or more functions or processes with, for example, perception subsystem 302. More specifically, the LiDAR semantic network subsystem 625 is, or is an element of, the perception subsystem 302. The LiDAR semantic network subsystem 625 uses as input the point cloud data provided by the LiDAR subsystem 610. In this embodiment, the score $r_5$ of the LiDAR semantic network subsystem 625 is based on one or more of a mAP, average orientation error, or confusion matrix related to the LiDAR semantic network subsystem 625. The evaluation procedure, $R_5$, for the LiDAR semantic network subsystem 625 is to perform a semantics process (e.g., 3D semantic segmentation) on a collection of annotated point clouds and compare the results to target or pre-identified results. The output of the LiDAR semantic network subsystem 625 includes data related to a segmentation mask of the LiDAR data or 3D objects (e.g., a number of the objects, their shape, their location, etc.).

The AV stack 600 further includes a localization subsystem 630, which is denoted as $s_6$. The localization subsystem 630 shares one or more functions or processes with, for example, localization subsystem 308. The localization subsystem 630 uses as input the map data provided by the database subsystem 615 and the segmentation mask provided by the LiDAR semantic network subsystem 625. In this embodiment, the score $r_6$ of the localization subsystem 630 is based on an average distance error in the identified location of the vehicle. The evaluation procedure, $R_6$, for the localization subsystem 630 is to estimate the location of the vehicle based on pre-identified point clouds, segmentation masks, and maps, and compare the result to a known target output for the pre-identified point clouds, segmentation masks, or maps. The output of the localization subsystem 630 is data related to the location of the AV.

The AV stack 600 further includes a tracking subsystem 635, which is denoted as $s_7$. The tracking subsystem 635 shares one or more functions or processes with, for example, perception subsystem 302. Specifically, in some embodiments, the tracking subsystem 635 is, or is an element of, the perception subsystem 302. The tracking subsystem 635 uses as input the map data provided by the database subsystem 615, the data related to 2D objects from the visual perception subsystem 620, and the data related to 3D objects from the LiDAR semantic network subsystem 625. In some embodiments, for example as shown in FIG. 6, the tracking subsystem 635 further receives as input data the data related to the vehicle location from the localization subsystem 630. In this embodiment, the score $r_7$ of the tracking subsystem 635 is based on a successful or clear multiple object tracking (MOT) process or object recall. The evaluation procedure, $R_7$, for the tracking subsystem 635 is to run the tracking subsystem 635 on a collection of annotated images and point clouds, and compare the results to known targets. The output of the tracking subsystem 635 is map data with identified objects, for example the classified objects 316, and their tracks.

Although the tracking subsystem 635 is described herein as being similar to, or an element of, the perception subsystem 302, in another embodiment the tracking subsystem 635 is additionally or alternatively similar to, or an element of, the planning subsystem 304. For example, in one embodiment the perception subsystem 302 will identify the objects such as classified objects 316, while the planning subsystem 304 will identify tracks of the objects as described above.

The AV stack 600 further includes a planning subsystem 640, which is denoted as $s_8$. The planning subsystem 640 shares one or more functions or processes with, for example, planning subsystem 304. The planning subsystem 640 uses as input the map data with the identified objects and their tracks provided by the tracking subsystem 635. In this embodiment, the score $r_8$ of the planning subsystem 640 is based on a reasonable crowd rating, as described in co-pending U.S. patent application Ser. No. 17/009,656, for "Scoring Autonomous Vehicle Trajectories Using Reasonable Crowd Data," filed Sep. 1, 2020, the contents of which are hereby incorporated by reference in their entirety. The evaluation procedure, $R_8$, for the planning subsystem 640 is to run the planning subsystem 640 on a collection of traffic scenarios and obtain scores for pre-identified rules.

Problem Formulation

In some embodiments, the problem formulation may be based on or related to one or both of the following two problems that are to be solved: model selection and attribute prioritization.

Model selection relates to choosing between multiple implementations of a particular subsystem to maximize system level performance. As an example, a system engineer may wish to choose between two versions of the visual perception subsystem 620. For the sake of this example, assume that both versions of the visual perception subsystem 620 have the same confusion matrix, but the first version of the visual perception subsystem 620 has a mAP that is higher by 1 percent (%) and an attributes' recall that is lower by 3% than the second version of the visual perception subsystem. The systems level performance that is identified by embodiments herein is one criteria which is usable to resolve the trade-off between mAP and attributes' recall.

Model selection and attribute prioritization are addressable by the embodiments disclosed herein under the ideal condition that an implementation can run any subsystem on the data contained in the test fixtures. Other embodiments can relate to the situation in which this assumption is not met (as is often the case in practice). As used herein, attribute prioritization relates to determining the attribute of a subsystem that maximizes system level performance.

It will be noted that the embodiments described herein are conditioned on the architecture of the AV stack and will need to be re-run when downstream modules change, which may be often. In one embodiment, it will therefore be desirable to organize the procedure such that the procedure runs whenever there is a change to the AV stack. Similarly, it will be desirable to re-run the procedure as data is collected and test fixtures are expanded. Generally, it will be desirable for the annotated data to sufficiently cover the operating design domain (the domain where the AV is designed to properly operate).

An Example Procedure for Identifying the Effect of a Subsystem on the AV Stack

A starting point for identifying the effect of a subsystem (or perturbation thereof) on the AV stack (e.g., AV stack 600) is the subsystems' scores on their current implementation. These operating point scores are denoted herein as $r_i^{o.p.}$ for $i=1, \ldots, N$. As the subsystems, or one or more parameters of the subsystems, are changed, then the procedure includes measuring how the score $r_N^{o.p.}$ of the decision-making unit $s_N$ changes.

As an example, consider subsystem $s_j$ for $j=1, \ldots, N-1$. An implementation would first construct a perturbed version of the subsystem $s_j$, which is denoted herein as $\tilde{s}_j$. In an embodiment, it is desirable for the perturbation of the subsystem to be small, for example on the order of how much the subsystem normally changes under successive release. It is also desirable to be able to approximate the change in the system level performance with a function linear in the perturbation, as the analysis may fail when the pertubations become too large. As one specific example, for a subsystem such as visual perception subsystem 620, the perturbed subsystem drops every $20^{th}$ detection, resulting in a subsystem with lower recall. Running the evaluation procedure $R_j$ on the perturbed outputs results in a perturbed score $\tilde{r}_j$.

The decision-making unit depends on $s_j$'s outputs, so if $s_j$ is perturbed, then $r_N$ will change. The changed system level performance is denoted herein by $\tilde{r}_N$, and the resulting datum is denoted by $(\tilde{r}_j, \tilde{r}_N)$. Based on the collected data, the gradient of $\tilde{r}_N$ is then estimated with respect to $r_j$ around the operating performance $r_j^{o.p.}$, which is denoted herein by $\hat{\nabla} r_N(r_j)|_{r_j^{o.p.}}$. The attribute that affects the system level performance the most is then identified as:

$$\operatorname{argmax} \hat{\nabla} r_N(r_j)|_{r_j^{o.p.}} \quad [5]$$

where the function "argmax" identifies the attribute that produces the largest change in $r_N$.

The gradient is estimated based on the data to fit a linear model between $r_N$ and $r_j$ as follows:

$$r_N(r_j) = \omega^t r_j + c \quad [6]$$

where $c$ is a scalar and $\omega$ is a vector of size $n_j$, which would require at least $n_j$ data points to perform the fit of the linear model between $r_N$ and $r_j$. $\omega$ and $c$ are obtained with, for example, linear least squares. The estimate of $\hat{\nabla} r_N(r_j)|_{r_j^{o.p.}}$, then, is $\omega$.

If it is desired to choose between $I_j$ alternative implementations of $s_j$ for $j \in \{1, \ldots, N-1\}$, then the procedure described above is modified as follows. Specifically, the decision-making unit's score for the ith implementation is denoted by $\tilde{r}_{N,i}$. Then, the Equation 5 is modified as:

$$\operatorname{argmax} \{\tilde{r}_{N,i}\}_{i=1}^{i=I_j} \quad [7]$$

Practical Issues Related to Test Fixtures

The procedure described above is based on an assumption that once a subsystem $s_j$ is perturbed, then the evaluation procedure can be re-run on all subsystems downstream to $s_j$. In real-world implementations, this assumption is often violated because respective subsystems often are associated with test fixtures that are developed to highlight specific aspects of that subsystem.

Figure 7:
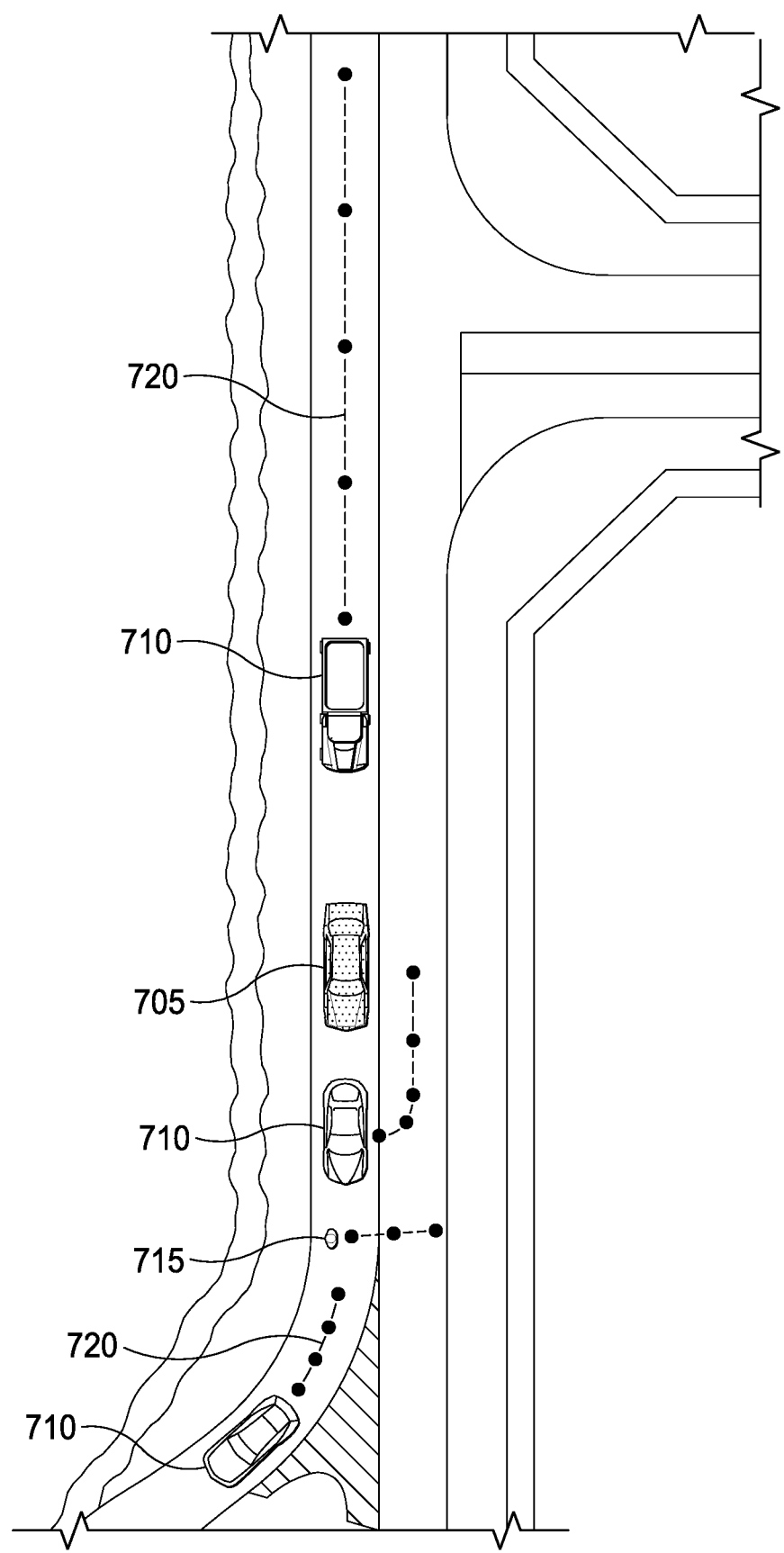
FIG. 7 is a diagram showing an example input to a planner, in accordance with various embodiments.

FIG. 7 depicts an example input to planning subsystem 640, in accordance with various embodiments. Specifically, FIG. 7 depicts the target AV 705 (e.g., the AV for which the AV stack 600 is being evaluated). The input further includes a number of other vehicles 710 and a pedestrian 715. The input further depicts trajectories 720 of the various objects such as the vehicles 710 and the pedestrian 715. In an embodiment, the trajectories 720 are past trajectories of the various vehicles 710 and the pedestrian 715, while in another embodiment the trajectories 720 additionally or alternatively include predicted trajectories of the various vehicles 710 and the pedestrian 715.

For example, in FIG. 7, the planning subsystem 640 operates on a bird's eye view (BEV) representation of a traffic scene with information on the map, and the location, past trajectories (e.g., tracks) and predicted trajectories of other agents. Consequently, the planning subsystem's 640 associated test fixtures are a collection of traffic scenes in BEV, and do not need sensor data (e.g., data from the camera subsystem 605, LiDAR subsystem 610, etc.) to generate an output. However, running the tracking subsystem 635 requires sensor data to generate an output. As a result, in this example it might not be possible to directly determine how a particular tracking subsystem 635 affects the planning subsystem's 640 scores, because it is not possible to run the tracking subsystem 635 using just the test fixtures of the planning subsystem 640.

Simulating the Effects of a Subsystem on a Downstream Subsystem's Test Fixture

In some cases the decision-making unit's test fixtures do not contain data that all subsystems can be run on. As a result, it is desirable to modify the idealized procedure described above. The modifications are discussed herein in the context of a simple example signal path of visual perception subsystem 620→tracking subsystem 635→planning subsystem 640. Using the terminology discussed above, the signal path is also represented as:

$$s_4 \to s_7 \to s_8 \quad [8]$$

First, for the sake of further discussion of this specific example, assume that model selection and attribute prioritization for the tracking subsystem 635 is the attribute that is to be perturbed to identify the effects of such perturbation on the planning subsystem 640. Because it is not possible to run the tracking subsystem 635 on the test fixtures of the planning subsystem 640, this analysis may be accomplished in two ways. A first way is to model the effects of the tracking subsystem 635 on the planning subsystem's 640 test fixtures. The second way is to augment the planning subsystem 640 with simulated data of the tracking subsystem 635. Embodiments herein generally relate to the first way.

As previously described and depicted with respect to FIG. 7, the planning subsystem's 640 test fixtures are BEV representations of a traffic scene, which contain ground-truth tracks (but not sensor data). Using the ground-truth tracks, it is desirable to estimate what tracks the tracking subsystem 635 (or perturbed versions of it) produce. To do so, embodiments herein degrade the ground-truth (e.g., by sub-sampling or adding noise) in such a way that if $R_7$ were run on the ground-truth and degraded tracks, it would produce a desired score $r_7$.

By repeating this procedure of simulating the effects of the tracking subsystem 635 on the planning subsystem's 640 test fixture, and determining how score $r_8$ changes, it is possible to collect data on the relationship between score $r_7$ and score $r_8$, and so address the issues of model selection and attribute prioritization for the tracking subsystem 635 as described above.

Simulating the Effects of a Subsystem on a Downstream Subsystem's Test Fixture

As an alternative example, for the sake of discussion for this section, assume that the attribute of interest is model selection and attribute prioritization for the visual perception subsystem 620. As described in the preceding section, it is possible to find the relationship between the tracking subsystem 635 and the planning subsystem 640 (e.g., $s_7$ and $s_8$). Similarly, it is possible to find the relationship between the visual perception subsystem 620 and the tracking subsystem 635 (e.g., $s_4$ and $s_7$), for example, using Equations 5, 6, or 7. As a result, given multiple versions of $s_4$ (e.g., the visual perception subsystem 620), it is possible to determine what system level performances the different versions of the $s_4$ would result in, which addresses model selection.

To address attribute prioritization, certain embodiments make use of the chain rule. The chain rule dictates that it is possible to write the gradient of $r_8$ with respect to $r_4$ as:

$$\nabla(r_8(r_7(r_4)))=Dr_7(r_4)^T \nabla r_8(r_7) \quad [9]$$

Where $Dr_7(r_4)$ denotes the Jacobian matrix. It will be noted that, with the chain rule, it is not necessary to directly know the relationship between $r_8$ and $r_4$. Rather, it is only necessary to know how $r_8$ changes as $r_7$ is perturbed, and then how $r_7$ changes as $r_4$ is perturbed.

By estimating the gradients based on fitting linear functions as described in Equation 6, embodiments obtain:

$$r_8(r_7)=\omega^T r_7+c, \quad [10]$$

$$r_7(r_4)=Wr_4+c, \quad [11]$$

where W is a matrix of dimensions $n_7 \times n_4$ (in the context of FIG. 6, $n_7$ is equal to 2, and $n_4$ is equal to 3), $\omega$ and c are vectors of size $n_7$, and c is a scalar. As a result, $$r_8(r_4)=\omega^T Wr_4+\omega^T c+c \quad [12]$$

The estimate of the gradient $r_8$ with respect to $r_4$ is then $W^T\omega$. It will be noted that this estimate is a coarse estimate of Equation 9, because in general the expectation value of a product of random variables is not equal to the product of the expectation values of each of the random variables. The argmax (shown in Equation [7]) then indicates which attribute to prioritize.

System Perturbation

The above examples describe analysis of the overall system based on perturbation of a subsystem. In general, there are different ways in which a subsystem may be perturbed.

A first technique for perturbing a subsystem is to degrade the outputs of that subsystem, for example with noise or other degradation technique. For example, for a 3D object detection subsystem (e.g., visual perception system 620, LiDAR perception subsystem 620), it is possible to perturb the distance of all its predictions by adding a Gaussian random variable (e.g., a Gaussian random variable of width 2 meters (m)).

Another technique for perturbing a subsystem is to inflate subsystem performance by using ground-truth data to supplement the outputs of the subsystem. For example, for a 3D object detector (e.g., part of visual perception subsystem 620) it is possible to improve the subsystem's recall by adding some of the missed predictions that were previously identified for the subsystem. In one embodiment, it will be desirable to ensure that this addition is done in such a way that a parameter of the subsystem, for example the recall per distance curve, remains of similar form (for example, the missed predictions that are added should not all be within the same distance stratum as one another).

Another technique is to modify a subsystem's architecture. For example, if the subsystem is, or is based on, a neural network, then one example embodiment modifies the neural network to be deeper. Additionally or alternatively, an example embodiment augments the inputs of the neural network. For example, if the subsystem operates on point clouds, then one example embodiment includes adding points to the ground-truth 3D boxes used by the subsystem.

It will be understood that the above-described embodiments are intended as non-exclusive examples. For example, other embodiments will include two or more of the above-described techniques, additional or alternative techniques, etc.

Summary of Example Procedure

Figure 8:
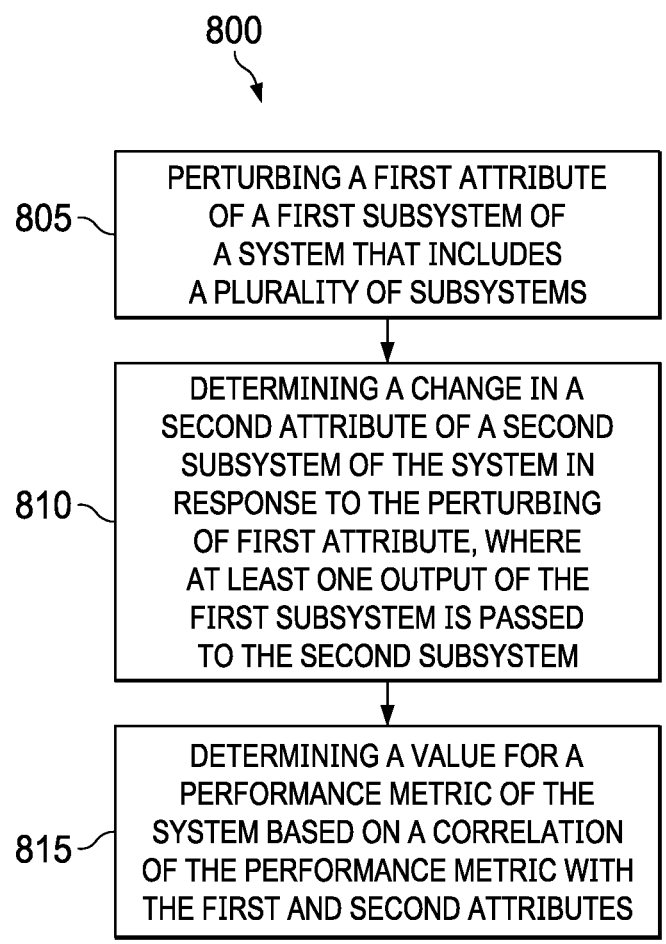
FIG. 8 is a diagram showing an example technique related to the modeling of an AV stack, in accordance with various embodiments.

FIG. 8 is a diagram showing an example technique related to the modeling of an AV stack, in accordance with various embodiments. More generally, the technique of FIG. 8 is a summary of various of the elements described above related to modeling the effects of perturbation of a subsystem of an AV stack on the overall performance of the AV stack.

The technique includes perturbing, at 805, a first attribute of a first subsystem of a system that includes a plurality of subsystems (such as AV stack 600). The technique further includes determining, at 810, a change in a second attribute of a second subsystem of the system in response to perturbing of the first attribute, where at least one output of the first subsystem is passed to the second subsystem.

In some embodiments, in the context of the description herein, the first subsystem includes the tracking subsystem 635 and the second subsystem includes the planning subsystem 640. As described above, in some examples, perturbing a first attribute of the tracking subsystem 635 includes degrading a ground-truth of a tracker, thereby producing a change in the score $r_8$ of the planning subsystem 640.

The technique further includes determining, at 815, a value of a performance metric for the system in response to the perturbing of the first attribute based on a first correlation between the first attribute and the second attribute, and a second correlation between the second attribute and the performance metric (e.g., as described with respect to Equation 6).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    applying, using at least one processor, to a first subsystem of a plurality of subsystems included in an autonomous vehicle (AV), a first test fixture of one or more test fixtures applicable to the first subsystem;

perturbing, using the at least one processor, an attribute of the first subsystem;

obtaining a first output of the first subsystem, the first output generated due to an operation of the first subsystem using the first test fixture and the perturbed attribute, the first output indicative of a performance of the first subsystem;

computing, using the at least one processor, a first score based on the evaluation corresponding to the performance of the first subsystem based on the first output and the first test fixture;

providing the first output of the first subsystem as an input to a second subsystem of the plurality of subsystems included in the AV, wherein a second test fixture is applied to the second subsystem, the second test fixture being different than the first test fixture;

obtaining a second output of the second subsystem, the second output generated due to an operation of the second subsystem using the second test fixture and upon perturbation of the attribute of the first subsystem, the second output indicative of a performance of the second subsystem;

computing, using the at least one processor, a second score corresponding to the performance of the second subsystem based on the second output and the second test fixture; and determining, using the at least one processor, a value for a performance metric of the AV based at least on the first and second scores.

2. The method of claim 1, wherein determining the value of the performance metric further comprises:
predicting the value of the performance metric using a gradient of perturbed first and second scores.

3. The method of claim 2, wherein the method further comprises simulating on the second test fixture how the first subsystem affects data in the second test fixture.

4. The method of claim 2, wherein the gradient is estimated using a linear model between the performance metric and the perturbed first and second scores.

5. The method of claim 4, wherein the value of the performance metric is predicted by applying a linear least squares formulation to the linear model.

6. The method of claim 1, wherein the value for the performance metric is a first value, the method further comprising:
applying, to the first subsystem, a third test fixture that is different than the first test fixture or the second test fixture;
obtaining an updated output of the first subsystem, the updated output generated due to an operation of the first subsystem using the third test fixture and the perturbed attribute, the updated output indicative of the performance of the first subsystem with the third test fixture;
computing an updated score corresponding to the performance of the first subsystem based on the updated output and the third test fixture; and
determining an updated value of the performance metric based at least on the updated score of the first subsystem.

7. The method of claim 6, further comprising:
comparing the first value of the performance metric to the updated value;
determining a greater of the first value and the updated value based on the comparison; and upon determining that the first value is greater than the updated value, selecting the first text fixture for the first subsystem.

8. The method of claim 1, wherein the performance metric is a system level objective function.

9. The method of claim 1, wherein the plurality of subsystems are included in a software stack of the AV and the performance metric is an objective function output that measures a quality of the AV's driving behavior.

10. The method of claim 9, wherein the first subsystem is a sensor subsystem and the second subsystem is a perception subsystem that receives sensor data from the sensor, the method further comprising:
obtaining object detections output by the perception subsystem;
providing the object detections to a tracking subsystem included in the plurality of subsystems of the AV;
obtaining object tracks output by the tracking subsystem;
providing the object tracks to a planner subsystem; and
determining the performance metric using a processor and a test fixture applied to the planner subsystem.

11. The method of claim 10, wherein the object tracks are simulated by degrading ground-truth tracks in the planner subsystem's test fixtures.

12. The method of claim 1, wherein the performance metric takes into account a failure rate of at least one of the first or second subsystems.

13. The method of claim 1, wherein perturbing the attribute of the first subsystem comprises at least one of:
applying noise to the attribute,
adding a Gaussian random variable to the attribute,
supplementing the first output of the first subsystem using ground-truth data, or
modifying a configuration of the first subsystem.

14. The method of claim 1, wherein the attribute is a first attribute of the first subsystem and the value of the performance metric is a first value of the performance metric, the method further comprising:
perturbing a second attribute of the first subsystem that is different than the first attribute;
obtaining an updated first output of the first subsystem, the updated first output generated due to an operation of the first subsystem using the first test fixture and the perturbed second attribute, the updated first output indicative of an updated performance of the first subsystem due to perturbing the second attribute;
computing an updated first score corresponding to the updated performance of the first subsystem based on the updated first output and the first test fixture;
providing the updated first output of the first subsystem as an input to the second subsystem;
obtaining an updated second output of the second subsystem, the updated second output generated due to an operation of the second subsystem using the second test fixture and upon perturbation of the second attribute of the first subsystem, the updated second output indicative of an updated performance of the second subsystem;
computing an updated second score corresponding to the updated performance of the second subsystem based on the updated second output and the second test fixture; and
determining, using the at least one processor, an updated value for the performance metric of the AV based at least on the updated first and updated second scores.

15. The method of claim 14, further comprising:
comparing the first value of the performance metric to the updated value;
determining a greater of the first value and the updated value based on the comparison; and
upon determining that the first value is greater than the updated value, prioritizing the first attribute over the second attribute for the performance of the first subsystem.

16. A system comprising:
at least one processor;
memory storing instructions that when executed by the at least one processor, cause the at least one processor to perform operations comprising:
applying, to a first subsystem of a plurality of subsystems included in an autonomous vehicle (AV), a first test fixture of one or more test fixtures applicable to the first subsystem;
perturbing an attribute of the first subsystem;
obtaining a first output of the first subsystem, the first output generated due to an operation of the first subsystem using the first test fixture and the perturbed attribute, the first output indicative of a performance of the first subsystem;
computing a first subsystem score corresponding to the performance of the first subsystem based on the first output and the first test fixture;
providing the first output of the first subsystem as an input to a second subsystem of the plurality of subsystems included in the AV, wherein a second test fixture is applied to the second subsystem, the second test fixture being different than the first test fixture;
obtaining a second output of the second subsystem, the second output generated due to an operation of the second subsystem using the second test fixture and upon perturbation of the attribute of the first subsystem, the second output indicative of a performance of the second subsystem;
computing a second subsystem score corresponding to the performance of the second subsystem based on the second output and the second test fixture; and
determining a value for a performance metric of the AV based at least on the first and second scores.

17. The system of claim 16, wherein determining the value of the performance metric further comprises:
predicting the value of the performance metric using a gradient of perturbed first and second scores.

18. The system of claim 17, wherein the operations further comprise simulating on the second test fixture how the first subsystem affects data in the second test fixture.

19. The system of claim 17, wherein the gradient is estimated using a linear model between the performance metric and the perturbed first and second scores.

20. The system of claim 19, wherein the value of the performance metric is predicted by applying a linear least squares formulation to the linear model.

21. The system of claim 16, wherein the value for the performance metric is a first value, the operations further comprising:
applying, to the first subsystem, a third test fixture that is different than the first test fixture or the second test fixture;
obtaining an updated output of the first subsystem, the updated output generated due to an operation of the first subsystem using the third test fixture and the perturbed attribute, the updated output indicative of the performance of the first subsystem with the third test fixture;
computing an updated score corresponding to the performance of the first subsystem based on the updated output and the third test fixture; and
determining an updated value of the performance metric based at least on the updated score of the first subsystem.

22. The system of claim 16, wherein the performance metric is a system level objective function.

23. The system of claim 16, wherein the plurality of subsystems are included in a software stack of the AV and the performance metric is an objective function output that measures a quality of the AV's driving behavior.

24. The system of claim 23, wherein the first subsystem is a sensor subsystem and the second subsystem is a perception subsystem that receives sensor data from the sensor, the operations further comprising:
obtaining object detections output by the perception subsystem;
providing the object detections to a tracking subsystem included in the plurality of subsystems of the AV;
obtaining object tracks output by the tracking subsystem;
providing the object tracks to a planner subsystem; and
determining the performance metric using a processor and a test fixture applied to the planner subsystem.

25. The system of claim 24, wherein the object tracks are simulated by degrading ground-truth tracks in the planner subsystem's test fixtures.

26. The system of claim 16, wherein the performance metric takes into account a failure rate of at least one of the first or second subsystems.

* * * * *

UNITED STATES PATENT AND TRADEMARK OFFICE
CERTIFICATE OF CORRECTION

PATENT NO. : 11,321,211 B1
APPLICATION NO. : 17/180649
DATED : May 3, 2022
INVENTOR(S) : Oscar Olof Beijbom and Bassam Helou Page 1 of 1

It is certified that error appears in the above-identified patent and that said Letters Patent is hereby corrected as shown below:

In the Claims

Claim 1, Column 23, Line 12, before "corresponding" delete "based on the evaluation".

Signed and Sealed this
Fifth Day of July, 2022

Katherine Kelly Vidal
*Director of the United States Patent and Trademark Office*